United States Patent [19]
Stewart et al.

[11] Patent Number: 5,356,986
[45] Date of Patent: Oct. 18, 1994

[54] PLASTICIZED FLUOROPOLYMERS

[75] Inventors: Charles W. Stewart, Newark; Peter D. Spohn, Wilmington, both of Del.

[73] Assignee: E. I. Du Pont de Nemours and Company, Wilmington, Del.

[21] Appl. No.: 107,645

[22] Filed: Aug. 20, 1993

Related U.S. Application Data

[63] Continuation-in-part of Ser. No. 935,354, Aug. 28, 1992, abandoned.

[51] Int. Cl.$^5$ .............................................. C08K 5/02
[52] U.S. Cl. .................... 524/462; 264/127; 428/520
[58] Field of Search ............... 428/520; 264/127; 524/462; 570/126, 130, 148, 161

[56] References Cited

U.S. PATENT DOCUMENTS

| | | | |
|---|---|---|---|
| 2,510,078 | 6/1950 | Compton et al. | 260/29.6 |
| 2,600,802 | 6/1952 | Passino | 260/33.8 |
| 2,720,498 | 10/1955 | Benning et al. | 260/33.8 |
| 2,748,098 | 5/1956 | Passino | 260/33.8 |
| 2,789,959 | 4/1957 | Smith | 260/45.5 |
| 2,789,960 | 4/1957 | Smith | 260/45.5 |
| 3,030,328 | 4/1962 | Mallouk | 260/31.8 |
| 3,069,401 | 12/1962 | Gallagher | 260/87.7 |
| 3,434,996 | 3/1969 | Salatiello et al. | 260/33.8 |
| 3,557,034 | 1/1971 | Thomas | 260/30.8 |
| 3,665,067 | 5/1972 | Hopkin | 264/127 |
| 3,804,801 | 4/1974 | Day et al. | 260/42.27 |
| 4,012,453 | 3/1977 | Nychka et al. | 260/649 |
| 4,039,595 | 8/1977 | Dimmig | 260/653.1 |
| 4,413,094 | 11/1983 | Aufdermarsh, Jr. | 525/187 |
| 4,739,112 | 4/1988 | Savu | 570/130 |
| 4,810,765 | 3/1989 | Modena et al. | 526/249 |
| 4,894,418 | 1/1990 | Strepparola et al. | 525/185 |
| 4,895,990 | 1/1990 | Sargent et al. | 570/130 |
| 5,061,759 | 10/1991 | Tommasi et al. | 525/326.3 |
| 5,202,372 | 4/1993 | Moggi et al. | 524/462 |
| 5,237,049 | 8/1993 | Cavanaugh et al. | 524/462 |

FOREIGN PATENT DOCUMENTS

| | | |
|---|---|---|
| 251285 | 1/1988 | European Pat. Off. |
| 50-151248 | 12/1975 | Japan |
| 52-134657 | 11/1977 | Japan |
| 618387 | 1/1977 | U.S.S.R. |
| 1281822 | 12/1969 | United Kingdom |
| 1364495 | 8/1974 | United Kingdom ......... C07C 19/08 |

*Primary Examiner*—Veronica P. Hoke
*Attorney, Agent, or Firm*—Edwin Tocker

[57] ABSTRACT

Fluoroelastomers and fluoroplastics are plasticized with high-boiling fluorinated aliphatic cyclic structures to enhance processibility or to improve final properties.

20 Claims, 3 Drawing Sheets

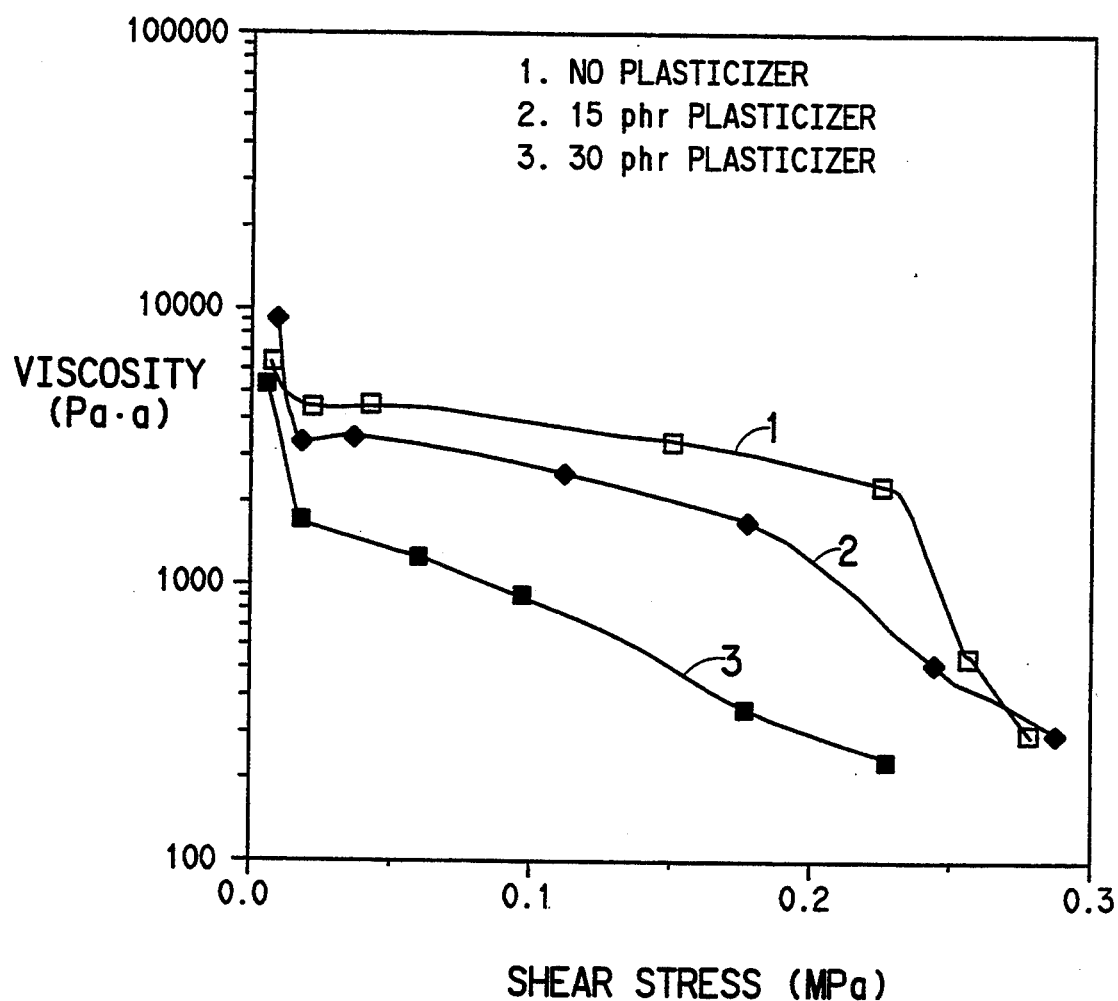

PLASTICIZED FLUOROPOLYMERS

This application is a continuation-in-part of application Ser. No. 07/935,354, filed Aug. 28, 1992, now abandoned.

FIELD OF THE INVENTION

This invention is in the field of plasticized fluoropolymers, including both fluoroplastics and fluoroelastomers.

BACKGROUND OF THE INVENTION

Plasticizing additives are used in plastics and elastomers to achieve various effects. Such plasticizers may improve melt processing characteristics or may modify physical properties of the polymer under use conditions, or both.

Highly fluorinated polymers have desirable combinations of electrical, chemical, and thermal properties. However, the high molecular weight required to realize the properties necessary for severe service conditions can make fluoropolymers difficult to process. Tetrafluoroethylene (TFE) homopolymers are so intractable that conventional melt processing techniques cannot be used and articles are fabricated by methods adapted from powder metallurgy. Partially-crystalline copolymers of TFE with other fluorinated monomers are melt-fabricable but processing rates are limited, especially for grades designated for the most severe service. Likewise, the rates at which fluoroelastomers, both vinylidene fluoride ($VF_2$) copolymers and perfluoroelastomers, can be shaped are limited. In addition, the accessible balance of properties for fluoroelastomers is unsatisfactory for some uses, a softer or less stiff compound frequently being desired.

U.S. Pat. No. 3,665,067 discloses the use of hexafluorobenzene as a plasticizer for polytetrafluoroethylene (PTFE) in the fabrication process known as ram extrusion. U.S. Pat. No. 4,012,453 discloses the use of chlorofluorinated aromatic hydrocarbons as plasticizers for trifluorochloroethylene polymers.

U.S. Pat. No. 2,510,078 discloses the use of fluorinated oils as plasticizers for certain fluoroplastics including PTFE. U.S. Pat. No. 3,434,996 discloses the use of chlorofluorinated ethanes as extrusion lubricants for PTFE to overcome the deleterious effect on properties of oils, greases, and waxes when used as plasticizers. U.S. Pat. No. 3,030,328 discloses a copolymer of TFE and a fluorinated alpha-olefin plasticized with esters of fluoroalcohols with cyclic polycarboxylic acids to improve melt flow and toughness.

U.S. Pat. No. 3,069,401 discloses the use of $VF_2$/HFP copolymer greases in $VF_2$/HFP fluoroelastomers to change viscosity without altering the properties of the cured elastomer. Since the chemical compositions of the grease and the fluoroelastomer are similar, this appears to be equivalent to modifying the molecular weight distribution of the fluoroelastomer. U.S. Pat. No. 4,810,765 teaches the use of cotelomers of $VF_2$ which can participate in peroxide curing of fluoroelastomers. U.S. Pat. No. 3,804,801 discloses the use of a modified fluorosilicone polymer in a fluoroelastomer to improve low-temperature properties.

It is also known to use fluorinated polyethers as plasticizers for hydrogen-containing fluoroelastomers and perfluoroelastomers, as taught in by U.S. Pat. Nos. 4,413,094; 4,894,418; and 5,061,759. However, the polyethers have limited compatibility with the fluoropolymers and will exude at moderate concentrations unless modified to participate in the curing reaction.

SUMMARY OF THE INVENTION

This invention provides fluoropolymers plasticized with high-boiling, highly-fluorinated, polycyclic alkane. In one embodiment, the plasticizer is an oligomer of predominantly perfluorinated aliphatic fused-ring structures, which oligomer is a very viscous liquid containing high-boiling fractions that are glasses at room temperature.

Plasticized fluoroelastomers have enhanced processibility and an improved balance of properties. Plasticized fluoroplastics have enhanced processibility without sacrifice of properties.

BRIEF DESCRIPTION OF THE FIGURES

FIG. 4 is a graph showing viscosity vs. shear stress for plasticized TFE/HFP copolymer and control.

DETAILED DESCRIPTION OF THE INVENTION

The plasticizer of this invention is high-boiling, highly-fluorinated, polycyclic alkane. By high boiling is meant a boiling point of at least about 280° C. at atmospheric pressure. The boiling point may be the lower end of a boiling range. "Highly-fluorinated" as used herein means that the ratio F/H is at least 100.

The plasticizer of this invention includes complex mixture of highly-fluorinated aliphatic cyclic structures, herein called "fluoroalicyclic oligomer" or sometimes just "oligomer", that can be obtained as high-boiling byproduct of the fluorination of compounds having cyclic, preferably polycyclic, carbon skeletons using $CoF_3$ and fluorine according to British Patent 1,281,822. The structures can have perfluoroalkyl side chains. When the crude product is refined by fractional distillation, the high-boiling byproduct fraction is obtained. This higher boiling fraction, designated "fluoroalicyclic oligomer" or "oligomer", has been found to be useful as a plasticizer in fluoropolymers. The fluoroalicyclic oligomer can be further refined or fractionated if desired.

A preferred fluoroalicyclic oligomer is the high-boiling byproduct of the fluorination of phenanthrene to produce perfluorotetradecahydrophenanthrene, $C_{14}F_{24}$ (Rhone-Poulenc Chemicals, ISC Division, UK). When phenanthrene is thus fluorinated, the high-boiling fraction (oligomer) obtained upon fractional distillation of the crude liquid product has a boiling range of about 280°–400° C. at atmospheric pressure. As synthesized, oligomer is reported to contain small amounts of hydrogen and olefinic carbon. Post-treatment with fluorine to further fluorinate the highly-fluorinated oligomer is believed to reduce significantly, but not eliminate, the unsaturation and hydrogen content. The fluoroalicyclic oligomer derived from the fluorination of phenanthrene is herein designated "phen-oligomer" to indicate its source.

A fluorine-treated sample of phen-oligomer characterized in some detail was a viscous, transparent, colorless substance that boiled at about 322° C. Room-temperature viscosity is usually so high that the substance will not pour, remaining essentially undeformed when the container is tilted for several minutes. The material flows easily at about 60° C. Higher-boiling fractions are more viscous, and the highest-boiling fractions are glasses at room temperature, but flow readily at about 100° C.

Figure 1:
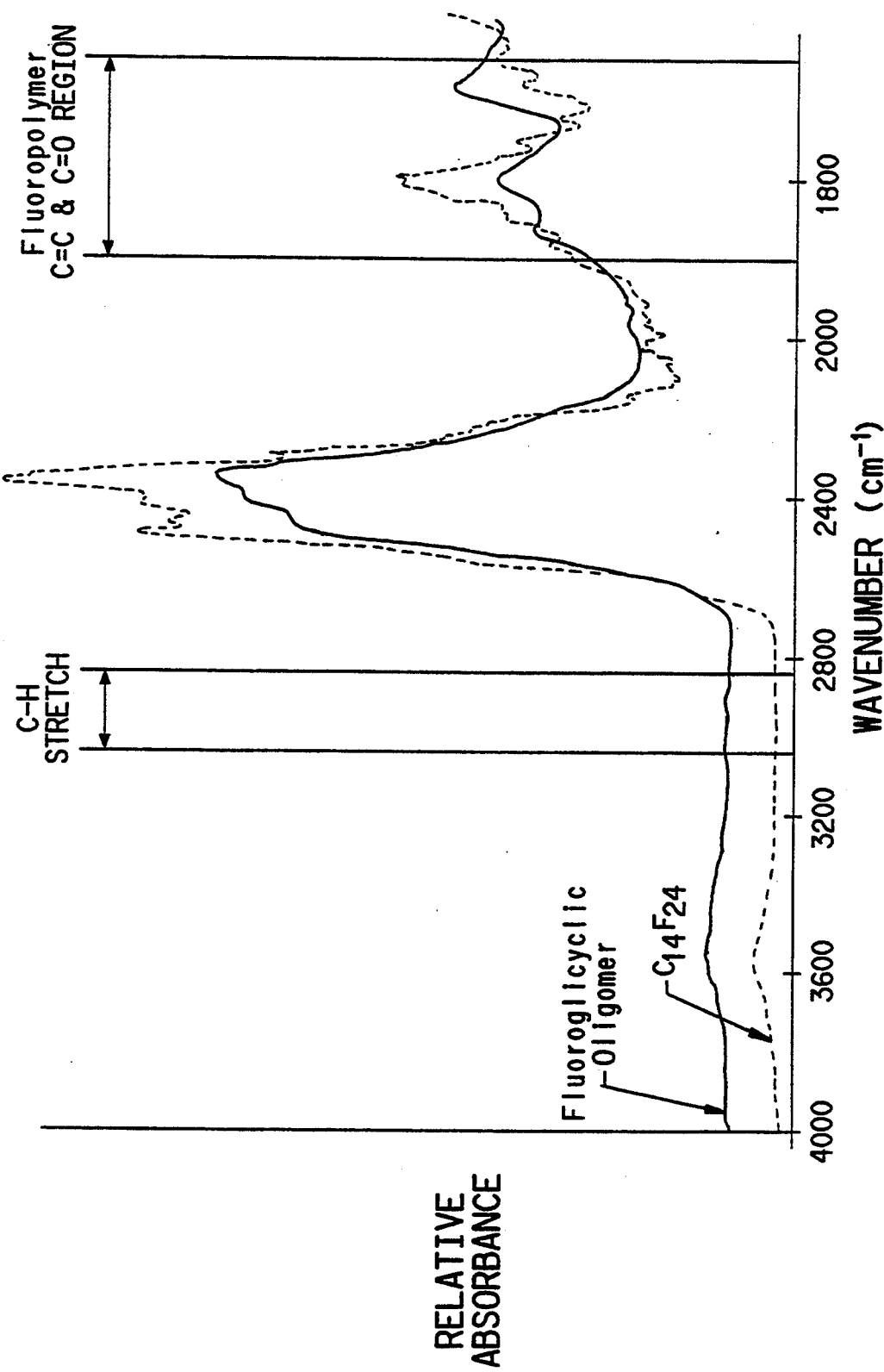
FIG. 1 compares the infrared spectra of $C_{14}F_{24}$ and oligomeric plasticizer of this invention.
Figure 2:
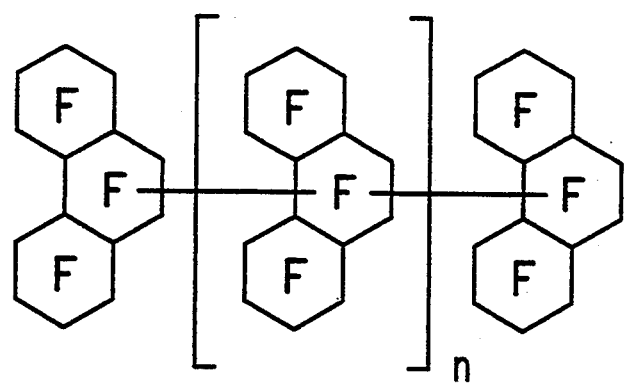
FIG. 2 shows an oligomer of the phenanthrene structure.
Figure 3:
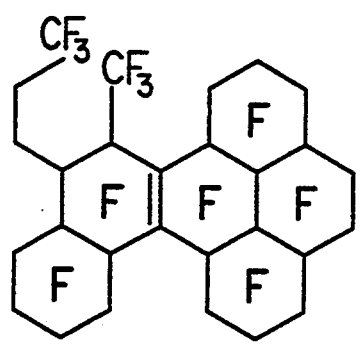
FIG. 3 shows a dimer with alkyl fragments and unsaturation.

A variety of analytical techniques led to the following characterization of this phen-oligomer fluoroalicyclic oligomer. As the wide boiling range would suggest, the material is a mixture of many components. ESCA and NMR indicated that the material is made up almost entirely of carbon and fluorine. Elemental analysis indicated hydrogen presence at 0.25 atomic percent, but proton NMR revealed only a much smaller trace and the 2900 cm$^{-1}$ region of the infrared spectrum (FIG. 1) shows no clearly discernible hydrogen. $^{19}$F NMR indicated that six-membered-ring aliphatic structures predominate. Phenanthrene-like structures are believed to predominate, consistent with FIG. 1, but there is evidence that anthracene-like structures are also present. The generalized chemical formula might be $C_{14}F_{23}(C_{14}F_{22})_nC_{14}F_{23}$ with n=0–2 predominating, as shown in FIG. 2. A wide diversity of structures would be obtained either by loss of fluorine atom pairs to create unsaturated carbon-carbon bonds or furthur ring closure, or by ring opening to yield perfluoroalkyl side groups. ESCA and NMR suggest that olefinic carbon may be present to the extent of 8% of total carbon. FIG. 3 shows a possible structure for an unsaturated dimer containing alkyl fragments.

The fluoropolymers of this invention are polymers of at least one flurorinated monomer, but may incorporate monomers containing no fluorine. The fluorinated monomers are selected from the group consisting of fluoroolefins and fluorinated vinyl ethers of the formula $CY_2=CYOR$ or $CY_2=CYOR'OR$ where Y is H or F, and —R, and —R'— are independently completely-fluorinated or partially-fluorinated alkyl and alkylene groups containing 1-8 carbon atoms. Preferred —R groups contain 1-4 carbon atoms and are preferably perfluorinated. Preferred —R'— groups contain 2-4 carbon atoms and are preferably perfluorinated. These fluoropolymers include hydrogen-containing fluoroelastomers, perfluoroelastomers, and fluoroplastics. Fluoroelastomers are distinguished from fluoroplastics by the general absense of crystallinity from fluoroelastomers, as evidenced by differential scanning calorimetry (DSC).

A wide variety of hydrogen-containing fluoroelastomers can be used in this invention. These polymers commonly, but not universally, incorporate vinylidene fluoride (VF$_2$) as a monomer. The most common fluoroelastomers are copolymers of VF$_2$ with hexafluoropropylene (HFP) and optionally TFE. Fluoroelastomers may include cure site moieties derived from chain transfer agents or small concentrations of cure site monomers, or both, usually to achieve peroxide-curable systems. Representative fluoroelastomers of this invention include those described in Rexford, U.S. Pat. No. 3,057,677; Honn, et al, U.S. Pat. No. 3,318,854; Pailthorp et al, U.S. Pat. No. 2,968,649; Gladding et al, U.S. Pat. No. 3,707,529; Tatemoto et al, U.S. Pat. No. 4,243,770; Apotheker et al, U.S. Pat. No. 4,035,565 and Moore, U.S. Pat. No. 4,973,633, all of which are hereby incorporated by reference. Perfluoroelastomers of this invention include those prepared from TFE, one or more perfluoro(alkyl vinyl) ethers (PAVE), and at least one cure site moiety. For purposes of the invention, minor portions of the TFE can be replaced by other perhaloolefins, such as chlorotrifluoroethylene. Perfluoro(alkyl vinyl) ethers preferred for use in this invention include perfluoro(methyl vinyl) ether (PMVE) and perfluoro(propyl vinyl) ether (PPVE). Small concentrations of monomers which are not perfluorinated can also be used without significantly changing the desirable characteristics of the perfluoroelastomers. Normally, such monomers are incorporated as cure sites to obtain desirable crosslinking characteristics and may be present in concentrations up to about 3 mol %. Such monomers can include, for example, bromotetrafluorobutene, bromotrifluoroethylene, and monomers containing cyano groups. Alternatively or additionally, chain transfer agents which are not perfluorinated can be used in the polymerization reaction to introduce desirable fragments into the polymer for curing purposes, and are considered cure site moieties in the context of the present invention. Such agents includ di-iodo compounds that result in bound iodine in the polymer, commonly at the end of the molecule. Representative perfluoroelastomers are illustrated in U.S. Pat. Nos. 3,467,638; 4,035,565; 4,281,092; 4,487,903; 4,529,784; 4,948,853 and 4,983,697; each of which is hereby incorporated by reference.

Fluoroplastics of this invention include but are not limited to the group known as TFE polymers. This group includes polytetrafluoroethylene (PTFE), and copolymers of TFE with such small concentrations of copolymerizable modifying monomers that the resins remain non-melt-fabricable (modified PTFE). The modifying monomer can be, for example, HFP, PPVE, perfluorobutyl ethylene (PFBE), chlorotrifluoroethylene (CTFE), or other monomer that introduces side groups into the molecule. The concentration of such modifiers is usually less than 1 mol %. The PTFE resins of this invention include both those derived from suspension polymerization (granular resin) and from emulsion polymerization (fine powder or coagulated dispersion resin). The group of TFE polymers also includes melt-fabricable copolymers of TFE with sufficient concentrations of one or more copolymerizable monomer to reduce the melting point significantly below that of PTFE. Such copolymers generally have :melt viscosity in the range $0.5 \times 10^3$ to $60 \times 10^3$ Pa.s, but viscosities outside this range are known. Comonomers with TFE can include perfluoroolefins, PAVE, and ethylene (E), for example, and these are preferred. When the preferred comonomer is E, minor amounts of a third monomer are used with PFBE or PPVE being especially preferred. Among perfluorinated comonomers, HFP and PPVE are most preferred. Other fluoroplastics within the scope of the invention are CTFE polymers including E/CTFE copolymers and vinylidene fluoride (VF$_2$) polymers including homopolymers and VF$_2$ copolymers with perfluoroolefins.

The concentration of high-boiling, highly-fluorinated, polycyclic alkane, e.g., fluoroalicyclic oligomer or phen-oligomer, used as plasticizer in the plasticized fluoropolymers of this invention varies with the fluoropolymer and the desired effect. The oligomer appears to be broadly compatible with fluoropolymers, especially perfluoropolymers, so large concentrations of oligomer may be used if desirable properties can be so obtained. When the fluoropolymer is an elastomer, oligomer concentrations of 2–50 phr (parts per hundred of resin) may be used. Concentrations of 5–30 phr are preferred. Concentrations of 5–20 phr are most preferred. When the fluoropolymer is a plastic, oligomer concentrations of 2–150 and even 2–400 phr can be used. Preferred concentrations vary with the fluoroplastic and the purpose, but generally 5–100 phr are preferred and 5–30 phr are most preferred.

The plasticized fluoropolymers of this invention are distinguished from solutions or gels in that the plasticized fluoropolymers are dimensionally stable under the force of gravity at room temperature. By "dimensionally stable" is meant that a substantially void-free (less than 1% voids) cylinder of plasticized fluoropolymer with 2.5 cm diameter and 10 cm height, standing unsupported on a solid surface, does not sag or slump or otherwise change shape perceptibly within 4 hr. Moreover, the mechanical properties of the plasticized fluoropolymers may be readily measured by testing methods appropriate for the unplasticized fluoropolymers or articles fabricated therefrom.

Methods of incorporating the high-boiling, highly-fluorinated, polycyclic alkane, e.g., fluoroalicyclic oligomer or phen-oligomer, into a fluoropolymer can be any of the mixing, blending, or compounding techniques known in the art and appropriate to the properties of oligomer and fluoropolymer. When the fluoropolymer is an elastomer, oligomer may be incorporated using conventional techniques for such materials, mixing on standard rubber processing equipment such as two-roll rubber mills or internal mixers. This may be done separately or in conjunction with the compounding of curatives, fillers, acid acceptors, processing aids, or other additives into the elastomer as needed to obtain a compound that can be cured to desired final properties. When the fluoropolymer is a melt-fabricable plastic, conventional melt blending techniques using equipment such as but not limited to twin-screw extruders, single-screw extruders, or internal mixers may be used to incorporate oligomer into the fluoropolymer. Alternatively or additionally, oligomer may be deposited on the fluoropolymer particles or pellets from solution in a relatively volatile solvent. When the fluoropolymer is not melt-processible, means of distributing oligomer uniformly throughout the fluoropolymer matrix are more limited and deposition from solution on the fluoropolymer particles before fabrication is particularly suitable. In any event, the plasticizer can be combined with the fluoropolymer to give a substantially void-free composition. Pigments, fillers, and other additives conventionally used may also be incorporated into fluoroplastics plasticized with oligomer.

Methods of fabricating articles from fluoroelastomers plasticized with the high-boiling, highly-fluorinated, polycyclic alkane, e.g., fluoroalicyclic oligomer or phen-oligomer, can be any of those known in the art. Methods of fabricating articles from fluoroplastics plasticized with oligomer can include most of the extrusion, injection molding, compression molding, and transfer molding techniques known in the art. However, high-temperature fabrication techniques that do not include the application of pressure may not be suitable if the temperature is high enough to volatilize the oligomer, although relatively thin sections might tolerate oligomer escape without damage if enough oligomer is retained to have the desired plasticizing effect. In other words, the fabricated article is of the fluoropolymer plasticized with highly-fluorinated, polycyclic alkane.

In addition to having the utility of forming fabricated articles from plasticized fluoropolymer compositions of the present invention, the plasticized fluoropolymer composition may also be used to bond at least two fluoropolymer surfaces of at least one article together by having the composition interposed between and in contact with the two surfaces, the fluoropolymer of the plasticized composition being the same or different from the fluoropolymer of the two surfaces, followed by heating the composition to bond the surfaces one to the other through or via the composition without appreciable permanent deformation of the article. Generally this utility will be carried out with multiple surfaces of a single article or one or more surfaces of a plurality of articles in order to bond such articles together. The steps of interposing the composition between and in contact with the surfaces and heating the composition to effect the bonding can be carried out in any sequence or simultaneously. Normally, some pressure will be involved to force the surfaces being bonded towards one another to achieve intimate contact with the composition interposed there between but the pressure should be not so high as to cause permanent deformation of the articles during the heating of the composition. As one skilled in the art will recognize, various confining or restraining devices may be used to help prevent flow during this operation.

In this utility the plasticized fluoropolymer composition acts as an adhesive to bond the fluoropolymer surfaces together. In one embodiment the composition can be in particulate form distributed between the surfaces. In another embodiment, the plasticized fluoropolymer composition can be in a fabricated form such as a wafer or ribbon interposed between the surfaces to be bonded together. In either case, the composition acts upon heating to bond the surfaces together. The composition in the particulate form, if not a cured fluoroelastomer composition, can coalesce during the heating step to form a substantially void-free adhesive layer, the same as when the plasticized fluoropolymer composition in the form of a fabricated article is used to bond surfaces together. If the composition is an uncured fluoroelastomer composition, it can be cured during the bonding procedure.

The heating of the plasticized fluoropolymer composition in this adhesive utility can be accomplished by conventional means. The composition may be preheated before it is interposed between the surfaces to be bonded together, followed by heating to effect the bonding of the surfaces together. When the fluoropolymers of the surface and of the plasticized composition are crystalline polymer, such polymers will have melting temperatures, and to effect selective melting of the plasticized fluoropolymer composition and non-melting of the fluoropolymer surfaces, it is preferred that the fluoropolymer composition have a lower melting temperature than the melting temperature than either of the fluoropolymer surfaces to be bonded together.

EXAMPLES

The invention is illustrated by the following non-limiting examples.

EXAMPLE 1

A hydrogen-containing fluoroelastomer generally of the type described in Example 17 of U.S. Pat. No. 4,035,565 except that the bromine-containing monomer was 4-bromo-3,3,4,4-tetrafluorobutene-1 was compounded with MT carbon black (30 phr) and phen-oligomer as the fluoroalicyclic oligomer (5 phr) on a two-roll rubber mill at 75° C. The oligomer was heated gently to a honey-like viscosity to enable it to be poured. Piston rheometry was carried out at 90° C. and 110° C. over the shear rate range 1–1000 sec$^{-1}$. Melt fracture was observed at 1, 5, and 10 sec$^{-1}$ but the extrudate was smooth at rates of 50–1000 sec$^{-1}$. A control with no oligomer exhibited melt fracture under all conditions.

EXAMPLE 2

A hydrogen-containing fluoroelastomer of the type described in Comparative Example A of U.S. Pat. No. 4,973,633 was compounded with 30 phr of MT carbon black and with 5 or 10 phr of phen-oligomer as the fluoroalicyclic oligomer. Extrudate from piston rheometry at 110° C. was smooth over the entire shear rate range 1–1000 sec$^{-1}$ for the compound with 10 phr oligomer, was smooth only at 1000 sec$^{-1}$ for the compound with 5 phr oligomer, and exhibited melt fracture at all shear rates except 10 sec$^{-1}$ for the control with no oligomer.

EXAMPLE 3

Fluoroalicyclic oligomer (phen-oligomer) was compounded with the fluoroelastomer of Example 1 and other ingredients on a two-roll rubber mill at 75° C. in the proportions given in Table 1. Piston rheometry at 110° C. showed melt fracture for the control (Sample A) at all shear rates over the range 1–1000 sec$^{-1}$ and no melt fracture over the same shear rate range for Sample D with an oligomer concentration of 20 phr. The compound was convened to a form suitable for physical testing by compression molding into sheet stock 15 cm square and 1.9 mm thick. The sheet was press-cured at 177° C. for 30 min, then post-cured at 232° C. for 24 hr in a circulating air oven. Specimens were die-cut from the sheet as called for by the test methods following. Tensile properties (ASTM D-412), tear strength (ASTM D-470), compression set at 200° C. for 70 hr (ASTM D-395), and hardness (ASTM D-395) were measured. Results are also given in Table 1. It is seen that oligomer enhances tensile elongation and both tensile and tear strengths while reducing modulus and compression set, the latter especially at oligomer concentrations of 5–10 phr. These results illustrate a plasticizing effect without adverse effect, and even with beneficial effect, on important properties.

TABLE 1

| Fluoroelastomer Compounds with Oligomer | | | | |
| --- | --- | --- | --- | --- |
|  | A | B | C | D |
| Ingredients (parts) | | | | |
| Fluoroelastomer | 100 | 100 | 100 | 100 |
| Oligomer | 0 | 5 | 10 | 20 |
| MT carbon black | 30 | 30 | 30 | 30 |
| Ca(OH)$_2$ | 4 | 4 | 4 | 4 |
| Triallyl isocyanurate[a] | 4 | 4 | 4 | 4 |
| "Luperco" 101XL[b] | 4 | 4 | 4 | 4 |
| Properties | | | | |
| Tensile strength (psi) | 2000 | 2150 | 2200 | 2450 |
| Elongation at break (%) | 60 | 85 | 195 | 230 |
| Modulus M100 (psi) | 920 | 75 | 780 | 660 |
| Tear strength (pli) | 12 | 14 | 13 | 14 |
| Hardness (Shore A) | 75 | 75 | 74 | 74 |

TABLE 1-continued

| Fluoroelastomer Compounds with Oligomer | | | | |
| --- | --- | --- | --- | --- |
|  | A | B | C | D |
| Compression set (%) | 42 | 35 | 37 | 40 |

[a]Diak ® No. 7 curing agent, Du Pont Co.
[b]Luperco 101XL is 45% 2,5-dimethyl-2-5-di-(t-butylperoxy) hexane on calcium carbonate substrate, Lubrizol Co.

EXAMPLE 4

An experimental partially-crystalline TFE/HFP copolymer resin was compounded with 15 and 30 phr of phen-oligomer as the fluoroalicyclic oligomer in a laboratory-scale internal mixer at 250° C. This TFE/HFP copolymer had molar composition of about 81.5/18.5 based on infrared measurement as described in U.S. Pat. No. 4,380,618, but using peak absorbances of bands found at 10.18 mm and at 4.25 mm, and melt viscosity of 1.2×10$^3$ Pa.s (U.S. Pat. No. 4,380,618). Piston rheometry was carried out at 225° and 250° C. over the shear stress range of about 0.01–0.28 MPa to assess the effect of oligomer incorporation on viscosity of the TFE/HFP copolymer resin. Results presented graphically in FIG. 4 for the testing at 250° C. show significant effect of oligomer.

EXAMPLE 5

To 15 g of a TFE/PPVE copolymer powder prepared by the method of European Patent 271,243 and having molar composition of about 98.5/1.5 were added 50 ml of 1,1,2-trichloro-1,2,2-trifluoroethane (CFC-113). A 32 wt % solution of fluoroalicyclic oligomer (phen-oligomer) in CFC-113 was added in amounts to give the concentrations of oligomer in the copolymer resin shown in Table 2. The CFC-113 was evaporated on a rotary evaporator under reduced pressure, and the material was then further dried at 80° C. for 0.5 hr in a circulating air oven. The melt flow rate (MFR) was then determined according to ASTM D-3307, with the following results showing the plasticizing effect of oligomer.

TABLE 2

| | Plasticized TFE/PPVE Copolymer | | | |
| --- | --- | --- | --- | --- |
| Oligomer | MFR | Tensile Properties | | |
| Conc. (phr) | (g/10 min) | TS (psi) | Elong. (%) | Mod. (psi) |
| 0 | 1.82 | 3617 | 327 | 22,849 |
| 10 | 2.43 | | | |
| 20 | 3.35 | | | |
| 30 | 3.84 | 3261 | 384 | 19,057 |
| 40 | 5.21 | | | |
| 50 | 7.68 | | | |
| 100 | 21.30 | | | |

EXAMPLE 6

This example demonstrates the benefit of added fluoroalicyclic oligomer in ram extrusion of suspension-polymerized (granular) PTFE. Oligomer (Phen-oligomer) was added to PTFE resin as part of the non-aqueous phase during solvent-aided-pelletization of the PTFE, as follows. To 300 g of fine-cut granular PTFE with average particle size of about 30 mm (Tellon ® TFE fluorocarbon resin grade 7A, Du Pont Company) in a 2-liter resin kettle were added 1000 ml of water and 111 ml of a solution of oligomer in CFC-113. The concentration of the oligomer solution was varied to give the added amounts indicated in Table 3. The mixture was stirred at 1200 rpm for 5 min, free water was drained off, and the PTFE pellets were dried in a circulating air oven at 100° C. for 4 hr.

A horizontal ram extruder with a 0.25-inch (0.64-cm) die and five heated zones set at 327°, 382°, 382°, 382°, and 260° C. in the order of feed to die was used. A constant volume of resin was fed for each cycle. The extrusion rate was varied by adjusting the dwell time for the ram in the forward position, i.e., the shorter the ram-forward time, the faster the extrusion rate. The control without oligomer was extruded first. A smooth rod was obtained with a ram-forward time of 7 sec, but a ram-forward time of 5 sec gave a rough rod with visible lines at charge boundaries (charge fracture or poker chipping). The pellets containing 5 or 17 phr of oligomer could be extruded into smooth, poker chip free rod at either 5 or 7 sec ram-forward time. Dumbbell-shaped specimens were machined from the rod for measurement of tensile properties, also shown in Table 3. As shown by the data, as little as 5 phr of oligomer facilitated the ram extrusion by allowing faster extrusion and yielded superior properties. Lesser and greater amounts of oligomer will be effective to impart improved ram extrudability to the resin. Pellets containing 17 phr of oligomer could also be extruded into smooth, poker chip free rod at both ram-forward times, but tensile measurements were not made.

TABLE 3

Ram Extrusion of PTFE Containing Oligomer

| Sample | Oligomer (g) | (phr) | Dwell Time (sec) | Tensile Properties TS (psi) | Elong. (%) |
|---|---|---|---|---|---|
| A | 0 | 0 | 7 | 4006 | 242 |
| B | 0 | 0 | 5 | 2507 | 137 |
| C | 15 | 5 | 7 | 5022 | 266 |
| D | 15 | 5 | 5 | 4926 | 259 |

EXAMPLE 7

A sample of phen-oligomer was fractionated into three cuts of approximately equal volume by vacuum distillation. The cuts had glass transition temperature $T_g$ of −22.6°, 26.0°, and 62.6° C. as measured by differential scanning calorimetry (DSC) and were identified as Cut 1, 2 and 3 in the stated order. The whole sample of oligomer and the three cuts were added in various concentrations to a TFE/PPVE copolymer similar to that of Example 5 except for melt flow rate by compounding the oligomer with copolymer cubes in an internal mixer (System 40 Controlled Torque Rheometer with Rheomix ® 3000-E mixer, Haake Buchler Instruments). MFR was determined at 372° C. according to ASTM D-1238 using a 5 kg weight. Plaques approximately 15 cm square and 3.2 mm thick were molded by the following procedure. A brass frame of appropriate dimensions was placed on a piece of polyimide film (KAPTON ®, DuPont Company). The blend (135 g) of copolymer and oligomer was placed in the square opening of the frame and was distributed uniformly. The filled frame was covered with another piece of polyimide film, and the assembly was placed between the platens of a laboratory press heated to 327° C. The press was closed to make contact with the assembly at an initial load of 3000 lb (1364 kg) and held in that position for 8 min. The load was increased to 10,000 lb (4545 kg) and immediately released. This load cycle was repeated three times. The load was again applied at 10,000 lb and held for 2 min, and then at 20,000 lb (9091 kg) for 2 min. The assembly was removed from the hot press and was immediately transferred to another press with water-cooled platens at 25° C. and held under 10,000 lb load for 4 min. The assembly was removed from the press, the polyimide film was stripped off the assembly and the plaque was removed from the frame. Tensile properties were determined according to ASTM D-1457 and flex modulus was determined according to ASTM D-790, all at 22° C. Sample compositions and test results are shown in Table 4. Concentrations in this example are in wt %. With the exception of two samples, the measured concentrations of oligomer were determined from weights of the samples as discharged from the internal mixer, before and after heating for 24 hr at 350° C. The measured concentrations for the compositions containing 20 wt % of whole oligomer and 10 wt % of Cut 3 were determined on the molded plaques. All cuts increase MFR in all concentrations, which increase would facilitate melt processing. Note the unusual results for Cut 3, with both flex modulus and MFR increasing with added oligomer fraction. A piece of several of the plaques was tested by dynamic mechanical analysis (Dynamic Mechanical Analyzer Model 983, TA Instruments; DMTA, Polymer Laboratories). Results show that the second order transition occurring near 100° C. in the neat TFE/PPVE copolymer, usually identified as the alpha transition, is shifted to lower temperature in the blends with fluoroalicyclic oligomer. This is consistent with the expected effect of a plasticizer. The magnitude of the shift varied with oligomer sample, and was greatest for Cut 1, least for Cut 3. The shift for Cut 2 was intermediate and about the same as the shift for the whole oligomer. However, the data indicate that the real part of the complex bending modulus for the blends, in a temperature range below the transition, is greater than the corresponding value for the neat TFE/PPVE copolymer at the same temperature. These observations are consistent with the flex modulus data in Table 4.

Flex life was measured for three of the plasticized samples following the method of ASTM D-2176 using a 4 lb (1.8 kg) weight and a #8 spring. For these measurements, a film 0.7 mm thick was used, molded by the general procedure used for the 3.2 mm plaques above. Each sample was tested five times and results were averaged. Using the flex life of the TFE/PPVE copolymer without added oligomer as reference, the compound with 20 wt % of whole oligomer had flex life of 1x, the compound with 10 wt % of Cut 2 had flex life of 3x, and the compound with 10 wt % of Cut 1 had flex life of 22x.

TABLE 4

Data Summary for Example 7

| Oligomer | Concentration (wt %) Added | Meas. | Tensile Properties TS (psi) | El. (%) | FlexMod (MPa) | MFR (g/10 min) |
|---|---|---|---|---|---|---|
| None | 0 | 0.8 | 3177 | 281 | 621 | 15.9 |
| Whole | 10 | 9.7 | 2703 | 140 | 643 | 20.0 |
| Whole | 20 | 18.1 | 2187 | 37 | 408 | 29.0 |
| Whole | 30 | 28.5 | 1640 | 22 | 270 | 50.4 |
| Cut 1 | 10 | 9.3 | 2580 | 259 | 368 | 20.1 |
| Cut 1 | 25 | 18.7 | 1290 | 108 | 134 | 33.0 |
| Cut 2 | 10 | 10.4 | 2713 | 125 | 623 | 20.8 |
| Cut 2 | 25 | 23.9 | 2574 | 3 | 585 | 38.9 |
| Cut 3 | 10 | 10.5 | 3145 | 223 | 931 | 21.4 |
| Cut 3 | 25 | 25.0 | 1987 | 2 | 1063 | 40.3 |

EXAMPLE 8

A supply of a modified PTFE resin prepared by the emulsion polymerization process (TEFLON® TFE fluorocarbon resin grade 6C, DuPont Company) was conditioned at 7° C. Such resin prepared by emulsion polymerization is also well know as PTFE fine powder. A 25 wt % solution of phen-oligomer in perfluoro(2-butyl tetrahydrofuran) (Fluorinert® FC-75, 3M Company) was prepared. An amount of the solution calculated to yield an oligomer/PTFE blend that was 22 wt % oligomer was added to 60 g of the PTFE resin in a wide-mouth bottle. The bottle was sealed, and the solution and resin were blended for 1 hr on a bottle roller. The bottle was allowed to stand for 24 hr, rolled for 4 hr, allowed to stand for another 24 hr, and finally rolled for another 4 hr. Then, the bottle was opened, covered with cheese cloth, and the FC-75 was removed from the blend by heating at 93° C. for 12 hr. The oligomer/PTFE blend was then cooled to room temperature. A second oligomer/PTFE blend containing 38 wt % oligomer was prepared by the same procedure. The two blends were paste extruded as well known in the art, without conventional lubricant, to make a beading using a capillary rheometer. Cylinder diameter was about 2.1 cm and die orifice diameter was 3.0 mm, yielding a reduction ratio of about 50. Extrusion temperature was 93° C. Ram speed was 10 mm/min. Part of each beading sample was sintered in a circulating air oven at 380° C. for 4 hr. These sintering conditions, which are more severe than required to sinter the PTFE resin, were chosen with the intent of driving most if not all of the phen-oligomer out of the beading. A control beading was made without oligomer, using the same PTFE resin and 18.5 wt % Isopar® G (Exxon Corporation) as extrusion lubricant. The control was extruded at room temperature, and was dried at 93° C. for 30 min. Tensile properties of the various beadings are summarized in Table 5.

TABLE 5

Summary of Results for Example 8

| Oligomer Conc. (wt %) | Sintered | Tensile Properties TS (psi) | Elong. (%) |
|---|---|---|---|
| 20 | No | 526 | 22 |
| 20 | Yes | 994 | 69 |
| 38 | No | 50 | 90 |
| 38 | Yes | 965 | 56 |
| Control | No | 148 | 43 |

The PTFE beading containing 20 wt % oligomer exhibited extremely high "green" (unsintered) strength which is valuable in applications when the unsintered PTFE must be subjected to rough handling. Thus, for unsintered PTFE fine powder, not only does the oligomer provide valuable plasticization properties, but also adds value to the paste extrusion thereof. Lubricant conventionally used and volatilized from the extrudate before sintering need not be used in favor of using oligomer as the paste extrusion lubricant. Sintering conditions can be chosen to achieve coalescence of the PTFE and retain most of the oligomer, e.g., by using short sintering time, thereby obtaining a plasticized composition after sintering. Moreover, the green paste extrudate may be useful in some applications, such as sealants or gasketing. Preferably, the amount of high-boiling, highly-fluorinated, polycyclic alkane used for this purpose (effective for rendering the PTFE fine powder paste extrudable) will be from about 15 wt % to about 50 wt % based on the combined weight of poly-cyclic alkane and PTFE.

We claim:

1. A plasticized fluoropolymer composition for fabrication into an article, comprising a fluoropolymer derived from at least one monomer selected from the group consisting of fluoroolefins and fluorinated vinyl ethers of the formula $CY_2=CYOR$ or $CY_2=CYOR'OR$, where Y is H or F, and —R and —R'— are independently completely-fluorinated or partially-fluorinated alkyl and alkylene groups containing 1–8 carbon atoms, said fluoropolymer plasticized with about 2–400 phr of high-boiling, highly-fluorinated, polycyclic alkane for fabrication into an article, said composition being dimensionally stable at room temperature and substantially void-free.

2. The composition of claim 1, wherein the polycyclic alkane is fluoroalicyclic oligomer.

3. The composition of claim 2, wherein the fluoroalicyclic oligomer is phen-oligomer.

4. The composition of claim 1, wherein the plasticizer concentration is about 2–150 phr.

5. The composition of claim 4, wherein the fluoropolymer is an elastomer and the plasticizer concentration is about 2–50 phr.

6. The composition of claim 5, wherein the plasticizer concentration is about 5–30 phr.

7. The composition of claim 6, wherein the plasticizer concentration is about 5–20 phr.

8. The composition of claim 5, wherein the elastomer is a hydrogen-containing fluoroelastomer.

9. The composition of claim 5, wherein the elastomer is a perfluoroelastomer.

10. The composition of claim 1, wherein the fluoropolymer is plastic.

11. The composition of claim 10, wherein the plasticizer concentration is about 5–100 phr.

12. The composition of claim 11, wherein the plasticizer concentration is about 5–30 phr.

13. The composition of claim 10, wherein the plastic fluoropolymer is a TFE polymer.

14. The composition of claim 1 wherein said alkane is incorporated into said composition by mixing, blending or compounding with said fluoropolymer.

15. A fabricated article comprising a plasticized fluoropolymer composition, comprising a fluoropolymer derived from at least one monomer selected from the group consisting of fluoroolefins and fluorinated vinyl ethers of the formula $CY_2=CYOR$ or $CY_2=CYOR'OR$, where Y is H or F, and —R and —R'— are independently completely-fluorinated or partially-fluorinated alkyl and alkylene groups containing 1–8 carbon atoms, said fluoropolymer plasticized with about 2–400 phr of high-boiling, highly-fluorinated, polycyclic alkane, said boiling point being at least about 280° C. and said degree of fluorination being a F/H ratio of at least 100, said composition being dimensionally stable at room temperature and substantially void-free.

16. Process for bonding at least two fluoropolymer surfaces of at least one article together, comprising interposing a plasticized fluoropolymer composition comprising a fluoropolymer derived from at least one monomer selected from the group consisting of fluoroolefins and fluorinated vinyl ethers of the formula $CY_2=CYOR$ or $CY_2=CYOR'OR$, where Y is H or F, and —R and —R'— are independently completely-fluorinated or partially-fluorinated alkyl and alkylene groups containing 1–8 carbon atoms, said fluoropolymer plasticized with about 2–400 phr of high-boiling, highly fluorinated, polycyclic alkane, said boiling point being at least about 280° C. and said degree of fluorination being a F/H ratio of at least 100 between and in contact with said two surfaces, the fluoropolymer of said composition being the same or different from the fluoropolymer of said surfaces, heating said composition to bond said surfaces one to the other through said composition without appreciable permanent deformation of said article.

17. Process of claim 16 wherein said composition is in the form of a fabricated article.

18. Process of claim 16 wherein the fluoropolymer composition has a lower melting temperature than the melting temperature of the fluoropolymer constituting said surfaces.

19. A process comprising preparing a composition comprising unsintered polytetrafluoroethylene fine powder with an amount of high-boiling, highly-fluorinated, polycyclic alkane, said boiling point being at least about 280° C. and said degree of fluorination being a F/H ratio of at least 100 effective to render said polytetrafluoroethylene fine powder paste extrudable, and paste extruding said composition.

20. A process comprising preparing a composition comprising unsintered polytetrafluoroethylene granular resin with an amount of high-boiling, highly-fluorinated, polycyclic alkane said boiling point being at least about 280° C. and said degree of fluorination being a F/H ratio of at least 100 effective to facilitate ram extrusion of said resin, and ram extruding said composition.

* * * * *

UNITED STATES PATENT AND TRADEMARK OFFICE
CERTIFICATE OF CORRECTION

PATENT NO. : 5,356,986

DATED : October 18, 1994

INVENTOR(S) : Charles W. Stewart and Peter D. Spohn

It is certified that error appears in the above-identified patent and that said Letters Patent is hereby corrected as shown below:

Column 12, line 14, delete "for fabrication into an article"

Signed and Sealed this

Thirty-first Day of January, 1995

*Attest:*

BRUCE LEHMAN

*Attesting Officer*  Commissioner of Patents and Trademarks